July 18, 1950 P. T. GIGUERE 2,515,341
DEICING ATTACHMENT FOR MOTOR VEHICLES
Filed Feb. 7, 1948
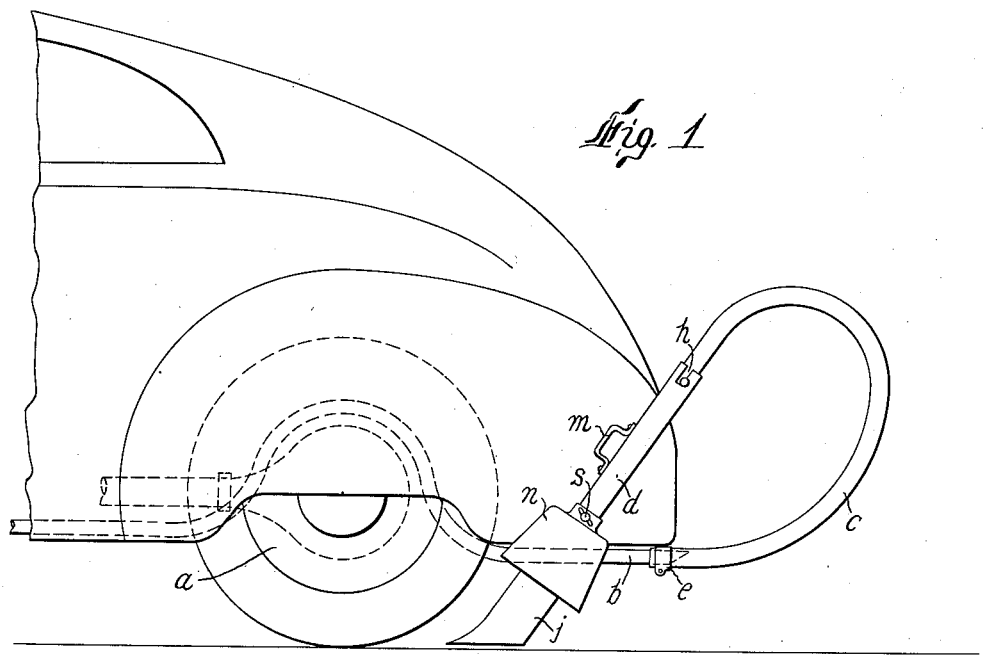
*Fig. 1*
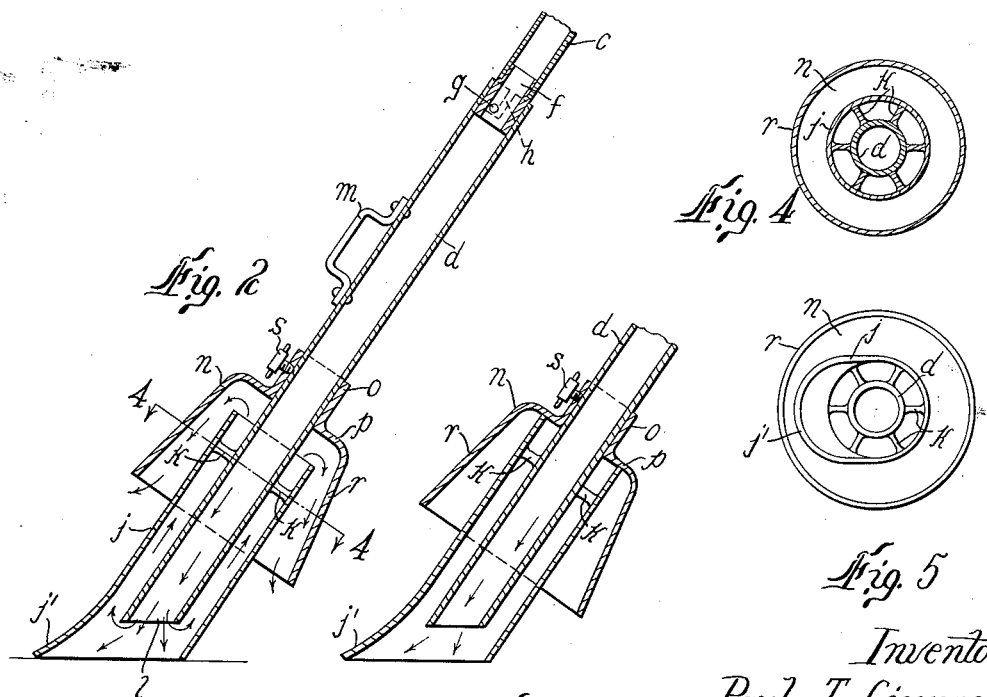
*Fig. 2*
*Fig. 3*
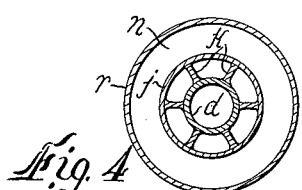
*Fig. 4*
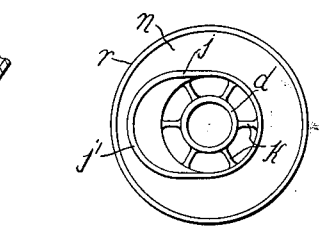
*Fig. 5*
Inventor
Paul T. Giguere
by Wright, Brown, Quinby & May
Attys

Patented July 18, 1950

2,515,341

UNITED STATES PATENT OFFICE 2,515,341

DEICING ATTACHMENT FOR MOTOR VEHICLES

Paul T. Giguere, Boston, Mass.

Application February 7, 1948, Serial No. 6,867

7 Claims. (Cl. 126—271.1)

1

The object of the present invention is to provide a means by which hot exhaust gases from the motor of an automotive vehicle can be applied for melting ice or snow on the ground adjacent to the driving wheels of the vehicle in such relation to the wheels as to block them or cause slippage, freeing brakes and brake rigging when held immobile by ice in cold weather, and for other useful purposes. It comprises a length of flexible tubing having a coupling at one end for detachable connection with the terminal of the exhaust pipe of a vehicle, and a delivery member or nozzle connected with the other end of the flexible tube and adapted to be directed against the spot or area where a frozen condition exists which can be and needs to be altered by heat. The invention also includes special characteristics of the terminal section or nozzle by which the heat of the exhaust gases is conserved and efficiently applied.

The drawings which accompany this specification illustrate an embodiment in practical form of the principles of this invention; and in these drawings, Fig. 1 is a side elevation of the rear end of an automobile showing the outlet terminal of the exhaust pipe and the attachment which contains this invention connected therewith and applied for its intended purpose near to one of the rear wheels;

Fig. 2 is a longitudinal section of the terminal member and nozzle of the device;

Fig. 3 is a view similar to Fig. 2, but showing the adjustable hood member which forms part of the terminal nozzle in a different position;

Fig. 4 is a cross section on line 4—4 of Fig. 2;

Fig. 5 is an end view of the nozzle.

Like reference characters designate the same parts wherever they occur in all the figures.

A conventional automotive vehicle of passenger car type is shown as to its rear end in Fig. 1. It is assumed in this illustration that the rear wheels are the driving wheels, and one of such wheels is shown at $a$. $b$ represents the rear end of the pipe by which exhaust gases are conducted away from the usual muffler and discharged into the atmosphere.

The de-icing attachment in which this invention is embodied comprises a flexible section or hose $c$ and a rigid terminal pipe section $d$. The flexible section may be a flexible hose of known character made of a helically wound metal strip with overlapping and interlocked edges made leakage tight by heat refractory packing material, such as asbestos fiber. I have not shown the structural details of this flexible tube, for various makes of this type of tubing are available on the market and I may use any one of such commercial tubes. One end of the flexible tube is equipped with a coupler adapted to be placed over the end of the exhaust pipe $b$ and secured thereto. Any one of a number of various types of coupler may be used for this purpose, and I have here shown by way of illustration a split sleeve or band $e$ of large enough internal diameter to pass over the exhaust pipe and provided with lugs through which a connecting bolt is passed to tighten the sleeve on the pipe.

The terminal section $d$ is a length of rigid pipe or tubing coupled to the other end of the flexible tube, either permanently or detachably. I have here shown, by way of illustration, a detachable connection of bayonet joint type consisting of a tubular nipple $f$ secured in the end of the flexible tube and projecting therefrom, adapted to enter the end of the rigid pipe $d$ and having a pin $g$ arranged to pass through a slot $h$ in the wall of the pipe and enter a lateral offset of such slot.

The end of the pipe $d$ remote from its coupled end is the emission nozzle. It is surrounded by a sleeve $j$, which is rigidly mounted on the pipe by arms $k$ so as to surround the pipe and an annular space of substantially uniform radial width open at both ends. Its outer end extends beyond the discharge orifice $l$ of the pipe $d$, and is cut off on a bevel so that its outer edge lies in a plane so inclined to the length of the pipe that it can be placed flat on the ground while the pipe as a whole is in an inclined position, substantially as shown. The discharge end of the pipe is preferably also beveled in a plane parallel to that of the end of the sleeve.

Preferably the bottom of the sleeve is outwardly flared at the side which meets the end plane at an acute angle, the profile of the flared portion being similar to the circumference of the wheel tire to enable hot gases flowing within the sleeve to be directed against the ground as close as possible to the wheel.

Further structural details of the pipe $d$, the outer sleeve $j$, and the connection between these elements, are not here shown, for these parts can be fabricated and connected in any of a number of ways well understood by persons skilled in the art. For instance, the discharge or nozzle end of the tube $d$, the outer sleeve, and the connecting arms may be made as an integral casting, or the arms may be made as the arms of a separate spider fitted and fastened to the tube, and the outer sleeve may be of sheet metal riveted or otherwise secured to the arms of the spider.

A handle m is secured to the side of the tube d for convenience of manipulation by the user. This tube is sufficiently long, and the handle is located far enough from the outlet end to enable the user to hold the tube and apply its terminal to the ground while standing upright or only slightly stooping. The handle, and also the tube, may be insulated against conduction of heat to protect the user from injury or discomfort in handling the tube while hot gases flow through it.

A hood n is mounted on the tube d, having a sleeve portion o which closely surrounds the tube back of the rear end of sleeve j, a radial web portion p which extends outwardly beyond the circumference of the sleeve, and a flaring skirt portion r extending from the web toward the nozzle end of the tube outside the sleeve and separated from the sleeve by an annular space. Preferably this hood is adjustable along the tube, and for that purpose its sleeve portion o is fitted slidingly on the tube and carries means, exemplified here by a set screw s, for securing it in any position within its range of possible movement. The positions in which it may be secured include one where the web portion p closes the rear end of the annular space between sleeve and tube, as shown by Fig. 3, and others, illustrated by Fig. 2, wherein a channel of greater or less width is opened from that annular space to the outer space surrounded by the skirt portion r.

When the hood is in one of the last mentioned positions, and exhaust gases are caused to flow through the tube, and the end of the sleeve is placed on the ground, the gases are caused to impinge on the area surrounded by the end of the sleeve and are allowed to flow back through the annular space and thence out from the open end of the hood, as indicated by the arrows. Free outlet is afforded to the gases, and at the same time the heat remaining in them after impinging on the ground and rebounding is effectively applied to minimize radiation losses from the hottest gases. Finally the escaping gases are directed toward the ground and part of the residual heat in them is utilized. Besides serving as a heat conserving jacket, the sleeve j also confines the hot gas to the area enclosed within its mouth, with intensive heating effect on the ground.

The hood can be set in the position shown in Fig. 3 when the nozzle is directed toward a frozen area but not in contact with an occluding surface, and in that position, the web portion prevents cold air from being entrained through the annular jacket space by the aspirator effect of the flowing hot gases.

This device when not in use can be stowed accessibly in the baggage compartment of a car. When needed, in such a case as when the wheels have insufficient traction to advance the car along an ice covered stretch of road, or a wheel is blocked between humps or ridges of ice or hard packed snow, the attachment can be quickly assembled and applied to the exhaust pipe. By directing the nozzle against the ice or snow while the engine is running fast enough to discharge a copious volume of hot gas, the ice or snow is quickly melted away. Even an ice layer of several inches thickness can be melted through to the ground in a few minutes, if necessary to obtain traction. In many instances a wheel blocked by a ridge or hump of ice can be freed by melting away the top of the ridge close to the wheel. Such obstructions can be thus removed more quickly and effectively than by chipping away the ice with a pick, and without liability of injury to the wheel tire. The outer sleeve j shields and protects the tire from being burned by the gases even when the nozzle is placed close to the tire.

What I claim is:

1. A de-icing attachment for connection with the exhaust pipe of a vehicle having an internal combustion engine, comprising a flexible tube, a rigid tube connected with the flexible tube in extension thereof and having a terminal nozzle, a sleeve surrounding said rigid tube and extending beyond the nozzle end of the tube, said sleeve being of larger diameter than the rigid tube and connected therewith in a manner to surround the tube and form an annular space open at both ends, and a stopper element adjustably mounted on the rigid tube with provision for placement in a position where it blocks the open rear end of such annular space and in another position where it leaves such annular space open for outflow of gases.

2. A de-icing attachment for connection with the exhaust pipe of a vehicle having an internal combustion engine, comprising a flexible tube, a rigid tube connected with the flexible tube in extension thereof and having a terminal nozzle, a sleeve surrounding said rigid tube and extending beyond the nozzle end of the tube, said sleeve being of larger diameter than the rigid tube and connected therewith in a manner to surround the tube and form an annular space open at both ends, and a hood mounted for movement lengthwise of the rigid tube back of the rear end of said sleeve, the hood having a web portion extending outwardly from the tube and a skirt portion extending lengthwise of the tube and being of larger transverse area in all parts of its length than the sleeve.

3. A nozzle for a de-icing attachment of the character described, comprising a tube having an outlet orifice at one end and a coupling element at the opposite end, and a sleeve or jacket of larger diameter than the tube secured to the tube at a location between the ends of the tube and in surrounding relation so as to surround the tube and form an annular space which is open at both ends and being extended at one end beyond the outlet orifice of the tube.

4. A de-icing attachment for connection with the exhaust pipe of a vehicle having an internal combustion engine, comprising a flexible tube, a rigid tube connected with the flexible tube in extension thereof and having a terminal nozzle, a sleeve mounted on said rigid tube and extending beyond the nozzle end thereof, said sleeve being of larger diameter than the rigid tube and so mounted as to surround the tube and form an annular space open at both ends, and a hood mounted on the rigid tube back of the rear end of said sleeve, having a web portion extending outwardly from the tube and a skirt portion extending from said web portion lengthwise of the tube and being of larger transverse area in all parts of its length than the tube, one of the elements constituted by the sleeve and hood being adjustable lengthwise of the rigid tube for placement in a position where the open rear end of the said annular space is blocked by said web portion, and in another position where a flow connection is established between the said annular space and the space enclosed within said skirt portion.

5. A nozzle for a de-icing attachment of the character described, comprising a tube having a discharge orifice at one end and a coupling element at the other end, a sleeve of larger diameter than the tube mounted on the tube in surrounding relation thereto so as to surround the tube and form an annular space open at both ends, and a hood mounted on the tube back of said sleeve having a web portion projecting on all sides to a distance greater than the width of such annular space and a skirt portion of larger transverse area than the sleeve in all parts of its length extending from said web portion so as to surround the rear end portion of the sleeve and the space adjacent thereto, one of the elements constituted by the sleeve and hood being adjustable lengthwise of the tube so as to close or open communication between the said annular space and the space enveloped by the skirt portion of the hood around the sleeve.

6. A nozzle for a de-icing attachment adapted to be connected with the exhaust pipe of the internal combustion engine of an automobile and to be placed manually adjacent to a wheel of such an automobile over snow or ice lying on the ground adjacent to such wheel, comprising a tube having a discharge orifice at one end, a sleeve or jacket of larger diameter than the tube secured to the tube at a location between the ends of the tube so as to extend beyond the discharge orifice and to surround the tube and form an annular space adjacent thereto, and a hood mounted on the tube back of said sleeve having a web portion extending outwardly in all directions to a distance greater than the diameter of the sleeve, and a skirt portion extending from said web portion surrounding the adjacent end of the sleeve and an intermediate annular space; the tube being adapted to conduct exhaust gases from the automobile engine and discharge such gases against snow or ice on the ground, and the sleeve and hood providing channels through which the gases flow with repeated reversals.

7. A nozzle for a de-icing attachment adapted to be connected to receive exhaust gases from the internal combustion engine of an automobile, comprising a tube having a discharge orifice, the tube being adapted to be placed manually with its orifice close to snow or ice on the ground contiguous to a wheel of such an automobile, a sleeve or jacket in spaced apart annular relationship to said tube extending beyond the orifice thereof, and a flow reversing hood secured to the tube back of said sleeve having a web portion spaced apart from the adjacent end of the sleeve and extending laterally outward in all directions to a distance greater than the radii of the sleeve, and a skirt portion extending from said web portion toward the discharge end of the tube surrounding the contiguous portion of the sleeve and an intermediate annular space.

PAUL T. GIGUERE.

REFERENCES CITED

The following references are of record in the file of this patent:

UNITED STATES PATENTS

| Number | Name | Date |
|---|---|---|
| 330,701 | Hawksworth | Nov. 17, 1885 |
| 896,774 | Totman | Aug. 25, 1908 |
| 1,124,289 | Burke | Jan. 12, 1915 |
| 1,157,297 | Cowell | Oct. 19, 1915 |
| 1,192,808 | Allen | July 25, 1916 |
| 1,215,620 | Carrillo | Feb. 13, 1917 |
| 1,359,967 | Copley et al | Nov. 23, 1920 |
| 1,462,861 | Jordan | July 24, 1923 |
| 1,547,765 | Lang | July 28, 1925 |
| 2,237,775 | Woods et al. | Apr. 8, 1941 |

FOREIGN PATENTS

| Number | Country | Date |
|---|---|---|
| 16,604 | Australia | Nov. 19, 1929 |